Figure 1:
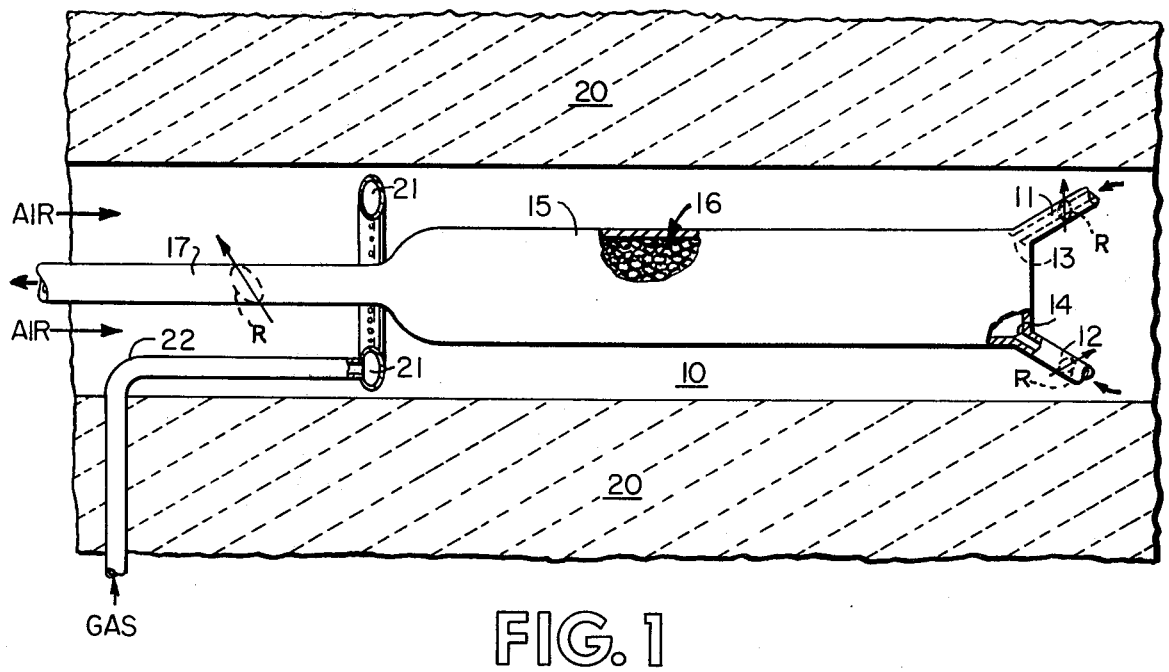

United States Patent [19]
Newkirk

[11] 3,992,165
[45] Nov. 16, 1976

[54] FUEL REFORMATION SYSTEM

[75] Inventor: Marc S. Newkirk, Harvard, Mass.

[73] Assignee: International Materials Corporation, Burlington, Mass.

[22] Filed: June 19, 1975

[21] Appl. No.: 588,306

Related U.S. Application Data

[63] Continuation-in-part of Ser. No. 438,697, Feb. 1, 1974, abandoned, which is a continuation of Ser. No. 328,886, Feb. 1, 1973, abandoned, which is a continuation-in-part of Ser. No. 202,938, Nov. 29, 1971, abandoned.

[52] U.S. Cl. .............................. 48/214 R; 48/215; 123/3
[51] Int. Cl.² ......................................... C10G 9/48
[58] Field of Search .................. 48/197 R, 211, 214, 48/94, 105, 99, 202, 196 R, 95, 215; 23/277 R, 281; 134/19, 22 C, 2; 123/1 A, 2, 3; 252/373; 208/48

[56] References Cited
UNITED STATES PATENTS

| | | | |
|---|---|---|---|
| 1,798,372 | 3/1931 | Dieterle | 48/211 |
| 3,119,669 | 1/1964 | Laird, Jr. et al. | 48/196 R |
| 3,197,293 | 7/1965 | Bergstrom | 48/214 |
| 3,437,714 | 4/1969 | Newman | 134/2 |
| 3,467,502 | 9/1969 | Davis | 208/48 Q |
| 3,641,190 | 2/1972 | Kivlen et al. | 134/22 C X |
| 3,721,253 | 3/1973 | Remke | 48/196 R |

OTHER PUBLICATIONS

Perry et al. "Chemical Engineers Handbook", 4th edition pp. 5–12, 1963.

*Primary Examiner*—S. Leon Bashore
*Assistant Examiner*—Peter F. Kratz
*Attorney, Agent, or Firm*—Cesari and McKenna

[57] ABSTRACT

The non-catylic steam reformation system is provided whereby the hydrocarbon is continually decomposed in the presence of superheated steam which serves to fix the product gases. The reactants are held at a high temperature and the reaction controlled to continuously achieve an equilibrium between thermal cracking of the hydrocarbon and the oxidation of resultant coke deposits by the superheated steam so that there is a substantially constant coke inventory.

16 Claims, 2 Drawing Figures

U.S. Patent Nov. 16, 1976 3,992,165

FUEL REFORMATION SYSTEM

RELATED APPLICATION

This application is a continuation-in-part of application Ser. No. 438,697, filed Feb. 1, 1974 which is a continuation of application Ser. No. 328,886, filed Feb. 1, 1973, which is, in turn, a continuation-in-part of application Ser. No. 202,938, filed Nov. 29, 1971, all entitled FUEL REFORMATION SYSTEM and all now abandoned.

BACKGROUND OF THE INVENTION

It has long been known that petroleum gases and liquids can be decomposed by the addition of heat. Such thermal decomposition has enjoyed extensive commercial application in the production of lampblack and certain petrochemical feedstocks. At one time, thermal "cracking", as it is called, was used to produce "town gas", an illuminating gas for domestic heating and lighting. Such thermal cracking processes produced a mixture high in illuminants such as methane and ethylene, and light residual oils, tars and cokes which were usually bothersome by-products. Steam was often added to such reactors, but with limited effect upon these problem by-products. In such thermal cracking of gas oil in the presence of steam, the steam and oil were usually passed over a hot structure, forming oil gas and leaving coke and tars in the reactor. The reactor was then blown with air to oxidize the carbon and heat the reactor bed to a temperature suitable for further introduction of steam and hydrocarbon. The process continued to operate in this alternating, push-pull manner, producing a high Btu product gas. Such generators were popular for many years, and still find application, but suffer the severe disadvantages of low thermal efficiency and poor control of gas quality inherent in discontinuous operation. Further, such discontinuous operation does not generally produce gas of sufficient quality to serve as input to sophisticated petrochemical processes, or synthetic methane plants. Examples of processes involving such discontinuity are found in U.S. Pat. No. 1,798,372; 3,365,387; and 3,641,190.

As the uses of refined products changed, and specifications became more sophisticated, it was necessary to develop new methods of treating petroleum liquids. Among the methods evolved was the gasification of oils to yield mixtures of light paraffins, olefins and elemental gases for fuel and petrochemical consumption. The invention disclosed here involves an improved process for the production of such gases from petroleum liquids including crude oil or oil obtained at the well head, gas oil, residual oil and the like.

Previous technology has produced two distinct approaches to the gasification of petroleum oils. In the most important of these processes, catalytic steam reformation, steam is reacted with vapors of normally liquid hydrocarbon over a suitable catalyst. The catalyst is employed for two distinct purposes: (1) to lower the temperature at which the desired reactions will occur at a reasonable rate; and (2) to encourage the preferential formation of certain of various possible products. However, a third very important effect of the catalyst involves the catalysis mechanism itself. In straight thermal cracking, reaction occurs by a mechanism involving free radicals. Such reactions can lead to polymerization and the precipitation of the coke. Catalysts initiate ionic reactions at acid sites, and free radicals do not naturally occur in the presence of such catalysts so long as relatively light feedstocks are employed. Consequently, by using the proper catalyst, one can minimize the problem of coke formation by the free radical mechanism. In steam reformation processes intended to gasify light liquid hydrocarbons (e.g. to produce syngas for petrochemical or fuels use), catalysts are used for the purposes just mentioned. By means of the catalyst, these reactions can be carried out in the usual range of 650°–815° C, and occasionally as high as 925° C reaction temperature. A catalyst, often nickel-based, is chosen which has high selectivity for the formation of light paraffins, such as methane, and light olefins such as ethylene. Coke precursors are inherently lowered as a result of this selectivity and the ionic reaction mechanism noted above. By means of this catalytic approach, steam gasification of feedstock as heavy as naphtha (final boiling point near 250° C) has been accomplished.

However, certain limitations of these catalytic steam reformation processes have been discovered. More particularly, most catalyst compositions require that the feedstock be relatively free of unsaturated hydrocarbons, which tend to deposit coke on the catalyst structure, causing physical degradation and reducing catalyst activity. This feedstock specification is met fairly readily with naphtha or lighter feedstocks, but as the molecular weight of the feedstock increases, the occurrence of olefins and aromatics rise dramatically, and the problem of coke precipitation is increased. Moreover, contaminants in the oils, such as sulfur compounds and metallic compounds, interfere with the reactivity of the catalyst. Both types of interference, by oil contaminants and by coke precipitation, are irreversible if the phenomenon is not noted and corrected almost immediately. Such degradation of the catalyst results in reactor malperformance, requiring shutdown and replacement of the often expensive catalyst. For this reason, catalytic steam reforming has been utilized commercially to gasify only substantially sulfur-free (usually less than 5 ppm weight) hydrocarbons of low end-point, even where this has required extensive pretreatment for removal of sulfur in the liquid phase.

The other and less important approach to the gasification of petroleum oils is based on non-catalytic oxidation of the hydrocarbons as a means of avoiding some of the aforementioned limitations of the catalytic processes. In these non-catalytic processes, air or purified oxygen is used as the oxidant, uniting directly with the hydrocarbons to produce oxides of carbon and releasing heat sufficient to cause thermal decomposition of the feedstock into desirable gaseous products. In certain of these processes, steam is also present and takes part in both oxidation and hydrogenation reactions. No means are provided to discourage the production of free carbon, and the affinity of the oxygen for carbon is assumed to be great enough to prevent excessive coke laydown. These processes are performed generally from 1390°–1480° C. This high temperature results in lowered thermal efficiency for the reaction as a whole, as there is no use for the waste heat at those temperatures. Also, most conventional heat exchange techniques do not work well at those temperatures, primarily due to materials considerations. Carbon residuals are usually maintained at about 2% of total carbon, and removed from the system mechanically, often on a continuous basis. Sometimes the carbon is taken up in a light oil slurry and recycled with the feedstock. Although reactor operability is not affected, thermal economy is further reduced.

The primary problem, however, is providing low-cost oxygen to these systems. If air is chosen as the oxidant, excessive dilution by nitrogen severaly limits the value of the product gas, and, in those plants utilizing pure oxygen, oxygen utility costs are often the highest operating costs involved. For reasons such as these, partial oxidation has not provided a suitable method for total, efficient gasification of high endpoint feedstocks not amenable to catalytic steam reformation.

SUMMARY OF THE INVENTION

Accordingly, it is an object of the invention described herein to provide a steam-hydrocarbon reformation method which achieves substantially total gasification without the use of a catalyst.

A second object of the invention is to provide a method of gasifying petroleum oils which is both continuous and noncatalytic.

Another object of the invention is to provide such a method which can utilize relatively unsaturated petroleum feedstocks.

A further object of the invention is to provide a method of maintaining a steam reformation reaction without detrimental buildup of coke or tars.

Yet another object of the invention is to provide a steam reformation process which can utilize hydrocarbon feedstocks containing relatively large amounts of contaminants such as sulfur, metals or ash.

A still further object of the invention is to provide a steam reformation process which is relatively insensitive to the specific gravity of the feedstock.

Yet a further object of the invention is to provide a method of gasifying petroleum oils which has a relatively high thermal efficiency.

Still another object of the invention is to provide a control system for a steam reformation reaction which will allow economic operation near a stable equilibrium point.

Still other objects of the invention will in part be obvious and in part appear hereinafter.

In general, my improved process involves the operation of a steam-hydrocarbon reformation system under conditions in which thermal considerations guarantee the gasification of the petroleum without buildup in carbon inventory. The system is operated at higher than usual temperatures sufficient to produce a rate of coke removal which is greater than or equal to the rate of coke formation. In particular, the system is operated at a temperature at which coke formation is effectively at a maximum but coke removal is still affected by temperature and is, in fact, enhanced by further temperature increases. More specifically, the reaction is maintained above 980° C, preferably in the range of about from 1130° C to 1390° C. Residence time within the reactor is advantageously maintained between 0.5 and 1.5 seconds.

Also, in my process, the molar ratio of the reactant steam to carbon in the reactant hydrocarbon is controlled and adjusted in such a manner as to aid gasification of coke due to equilibrium considerations, in order that the reaction may occur at the lowest possible temperature, while still maintaining said ratio as low as possible for economic reasons. In particular, the ratio preferably is held at or near a range of about from 1.5:1 to 5.0:1. The steam is preferably injected at a temperature of about 1000° C or higher.

Further, provision is made for varying the molar ratio continuously in response to the amount of carbon inventory in the reactor, in such a manner as to favor the maintenance of a specific size of inventory. More specifically, a constant back pressure outlet and constant supply pressures are provided in the reactor and calibrated orifices are situated at the entry of the reactants into the reactor. In this manner, the mass flow of reactants is made instantaneously proportionate to the pressure differential across the reactor, and consequently proportionate to the size of the carbon inventory. A variation in carbon inventory will result in a variation in mass flow of reactants and also in the molar ratio of steam-to-carbon, in such a manner as to favor equilibrium operation at a specific design point.

Gross control of the reactor operation is accomplished by the selection of an appropriate operating temperature and steam-to-carbon molar ratio for the feedstock under process, and fine control is automatically provided by the calibrated orifices/pressure differential outlined above and described in more detail hereinafter. By this process, relying strictly on thermal considerations, gasification of highly contaminated oils and of heavy oils can be accomplished, as can indeed the gasification of most petroleum feedstocks, by selection of operating parameters disclosed herein.

Furthermore, these feedstocks may be gasified without the use of a cataylst and with substantially no residual production of tars or coke. The presence of sulfur, metals or ash in the oils does not affect the operability of the mechanism either, and the process is relatively indifferent to the specific nature of the feedstock.

Although some variation in the makeup of the gas phase product is contemplated within the overall scope of this invention, the general objective is the conversion of all or substantially all of the liquid hydrocarbon feedstock into either fixed gaseous products or coke, and the simultaneous conversion of the coke into oxides of carbon by certain secondary reactions to be described later so as to maintain a constant coke inventory in the reactor.

SPECIFIC DESCRIPTION OF THE DRAWING

FIG. 1 is a diagrammatic view with parts broken away of a reactor suitable for carrying out the method of this invention. The reactor itself is shown generally at 10, consisting in the main of a reaction tube 15, a refractory packing structure 16, injection orifices 13 and 14, associated reactant delivery conduits 11 and 12, and a product exit conduit 17. Suitable heating and insulation structures of the furnace are also shown, including a ring burner 21, a fuel delivery tube 22 and insulation 20. Adjustable pressure regulators R are provided in conduits 11, 12 and 17 so that the supply pressure to the heater and the back pressure in the reactor can be controlled as will be described later.

Figure 2:
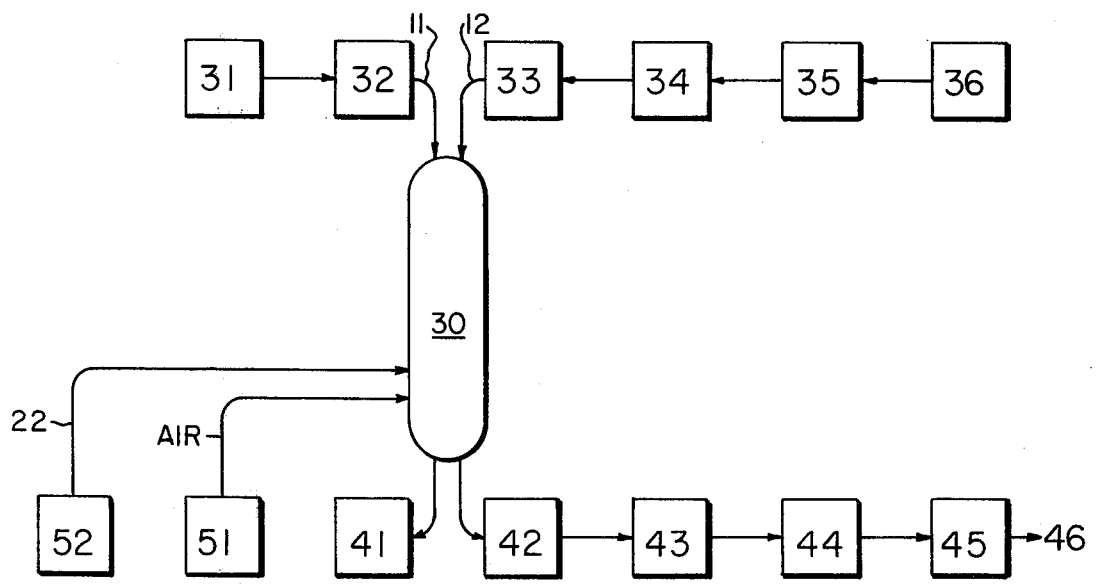

FIG. 2 is a block diagram of a plant utilizing the FIG. 1 reactor.

Referring to FIG. 1, reactor 10 is first heated to a suitable temperature, e.g. 1100° C, prior to introducing the reactants. Steam is generated and superheated in suitable apparatus (not shown) and supplied under pressure via conduit 12 and its orifice 14 to the reactor tube 15 component of reactor 10. Hydrocarbon feedstock, usually a "coke precursor" such as crude oil or residual oil is then pumped at suitable pressure and injected into reactor tube 15 by way of conduit 11 and its orifice 13. Both orifices, 13 and 14, may be so constructed as to act as spray nozzles to provide maximum dispersion and mixing of the reactants, or such nozzles may be provided in conduits 11 and 12 downstream of the orifices 13 and 14.

The mixed reactants injected into tube 15 immediately encounter refractory structure 16 located within the tube. This structure 16 is provided to encourage turbulence of the gas stream at the solid-gaseous phase boundary, to provide a large surface area to effect surface catalysis, and to encourage wide dispersion of the coke intermediary in order to maximize the rate of coke gasification. Structure 16 may be a series of screens, shavings, spirals, granules, or the like, of a suitable refractory material.

The tube 15 must also be composed of a suitable refractory material, capable of withstanding the corrosive effects of oxidizing and reducing gases at the reaction temperatures. Materials used in prior art reactors, such as nickel steel alloys, are of marginal value at the temperatures of this invention. Ceramic materials, such as recrystallized silicon carbide, are particularly suitable, although any material of equivalent characteristics could be used. Also, tube 15 may incorporate surface features, such as internal or external fins, to aid thermal transfer into the tube wall.

Reaction products are led from the reactor via conduit 17 for whatever additional treatment is desired or for direct consumption as product. Reactor 10 is located within a furnace with walls composed of insulation 20, made of suitable high temperature materials such as alumina, or certain aluminosilicates.

Heat to the reactor 10 is supplied by combustion of an appropriate fuel or slipstream of product gas. Ring burner 21 is provided for this purpose and fuel is led to the burner through conduit 22. Combustion air is directed past the ring burner and over tube 15 by a blower (not shown). A single reactor tube 15 is shown here but, of course, many such tubes could be located within the reactor. Also, the reactor components could be arranged differently to suit the particular application.

Although not desiring to be bound to any particular theory, it is believed that the chemical mechanisms involved in my process are generally described as follows: Petroleum oils are a complex mixture of hydrocarbons, often involving hundreds of different types of molecules. Each of these, of course, reacts in a different manner when heated to the point of decomposition. However, two main types of reaction are believed to occur. Paraffins are believed to decompose by elimination, yielding paraffins of shorter chain length and —$CH_2$— groups, which react with unsaturated structures or are directly hydrogenated to $CH_4$. Unsaturated long chains, and particularly aromatic hydrocarbons, break into free radicals. These radicals may unit with —$CH_2$— groups to form relatively saturated compounds of shorter chain length, and/or they may polymerize on the surface of the reactor tube 15. The polymers produced are relatively refractory and congregate on the surfaces of the reactor, where they tend to decompose further, leaving free carbon ("coke"). Compounds which are prone to this particular phenomenon are known as "coke precursors". The products of elimination and hydrogenation reactions are themselves hydrocarbons subject to further reactions of the general sort described above. However, all of the decomposition reactions eventually have two sorts of products: fixed gases, that is, compounds which are normally gases at standard conditions, and coke.

The reactions described above deal entirely with the thermal decompositions of hydrocarbons alone. In the process at hand, this decomposition is performed in the presence of and with the aid of an oxidant. In the primary embodiment, this oxidant is water, in the form of superheated steam, or a mixture in which part of the steam is substituted for by an oxygen-containing gas such as air to enhance oxidation of coke. When steam is added to the reaction tube 15 described, numerous additional reactions occur. One of these is a direct substitution or oxidation reaction of the hydrocarbon to an oxide of carbon, i.e.:

$$C_zH_y + XH_2O \rightleftharpoons XCO + (y/2+x)H_2 \qquad (1)$$

or, for a paraffin:

$$C_xH_{2x} + 2XH_2O \rightleftharpoons XCO + (2x+1)H_2 \qquad (2)$$

If sufficient excess steam is provided, a certain amount of the feedstock will be further oxidized to produce carbon dioxide, i.e.:

$$C_zH_y + 2XH_2O \rightleftharpoons XCO_2 + (y+2x)H_2 \qquad (3)$$

For light hydrocarbons (i.e. those in which $x$ is small, on the order of 1 to 4), reactions 1, 2 and 3 predominate. As $x$ increases, and as $y$ decreases with respect to $x$ (the hydrocarbon is increasingly unsaturated), these direct substitution reactions become less important. In fact, with long chain or aromatic hydrocarbons, it is believed that substantially none of the gasification occurs by the direct reaction of steam with the intact hydrocarbon. Rather, the system begins to take on the dual nature of thermal cracking and steam reformation.

Long chain hydrocarbons can decompose at two types of sites within the molecule: at the C—H bonds or at one of the carbon to carbon bonds. For all hydrocarbons, the bond energies are such that scission at the carbon-to-carbon bond is more likely, and this is particularly true of the double and triple bonds found in unsaturated hydrocarbons. The saturated portion of the molecule is relatively stable and inactive, and tends to be involved as a group in reactions. Therefore, the tendency of a long chain, say a butane or a heptane, is to divide in half. This division is really the beginning of the thermal decomposition described above, and has little to do with the presence of the steam in the system. However, the presence of the steam insures that a certain amount of reduction of water to free hydrogen will occur, and this hydrogen is available for hydrogenation of the radicals which are formed during thermal cracking. The effect, therefore, is to promote saturation of the hydrocarbons, while oxidizing portions of the molecule to fixed gases. As chain length decreases, and saturation occurs, reactions (1) and (3) become increasingly important. Thus, in the case of reactor tube 15 in which the reactants enter at one end and exit at the other, near the entry, cracking reactions predominate, and as the exit is approached, reactions (1) and (3) begin to be of major importance, until finally at the exit end of the tube, there is no thermal cracking at all occurring.

The presence of thermal cracking reactions in a steam reformation system means that the polymerization and coke precipitation phenomena will appear to some extent. Thermal cracking phenomena are experienced primarily at the entrance to the reactor tube 15; they decrease through the reaction zone. Polymers and tars, and consequently coke, appear in a gradient ranging from the heaviest concentrations at the entry to the reactor tube and no concentration at the end of the reactor tube. This coking gradient is, in fact, observing during operation of the FIG. 1 steam reformer.

Precipitated coke, if allowed to build up, would eventually reduce the operability of the reactor to zero. Carbon is a very effective thermal insulator, and a deposit of carbon on the walls of the reactor tube 15 and on structure 16 would impede thermal transfer into the reactant stream, and so cause yet further difficulties, for reasons to be explained. Moreover, the reactor tube would demonstrate an increasing pressure drop, creating problems with most conventional means of control, and would eventually clog entirely. Further, all carbon which is not totally gasified is lost to the thermal balance of the system, and represents a decrease in overall thermal efficiency. For these reasons, it is essential to provide a mechanism for the removal of the carbon from tube 15 at a rate at least equal to that at which it is being deposited there.

It is a well known fact that steam will react with hot iron or carbon to produce hydrogen. In the case of carbon, the reaction proceeds thusly:

$$C + H_2O \rightleftharpoons CO + H_2 \qquad (4)$$

or, in the presence of excess steam, $$C + 2H_2O \rightleftharpoons CO_2 + 2H_2 \qquad (5)$$

Therefore, in a steam reformation system which allows the formation of coke, some of the coke will react according to equations (4) and (5). Reaction (4) is rather incomplete at the temperatures at which catalytic steam reformation is normally performed (e.g., at 727° C $K_p \approx 2.6$ and at 827° C $K_p \approx 11.5$, $K_p$ being defined in Lange's Handbook of Chemistry), and reaction (5) is even less favored. It is primarily for this reason that conventional steam reformers are forced to use catalytic devices and to limit their feedstocks to exclude coke precursors in the manner described, to prevent carbon deposition as much as possible.

The equilibrium constant for reaction (4), as for most endothermic reactions, increases with temperature. In this case, $K_p$ increases very rapidly as the temperature is increased. For instance, at 1027° C, $K_p$ is approximately 113 and at 1227° C, $K_p$ is approximately 601. By increasing the temperature from 827° to 1027° C, the location of a stable equilibrium is favored by a factor of almost 10. However, the kinetics of the reaction are really more important than equilibrium considerations, if a reasonable space velocity is to be maintained. This is true for two distinct reasons. First, in order for the system to attain equilibrium, the reactants need to be held in contact for a fixed period of time determined by the rate. If the rate is too slow, then the resistance time will be excessive. Second, it is readily determined by inspection of the equilibrium constants that there is a residual amount of carbon even at the higher temperatures. Thus, there is no possibility of achieving zero carbon deposition due to equilibrium considerations alone. There will always be some carbon inventory distributed along the reactor path. The thrust of my new process involves finding a point at which the rate of reaction (4) is greater than or equal to the rate of the group of reactions which produce free carbon, so that the system is always working against equilibria as limits and a minimum coke level is maintained.

As noted above, at the temperatures of the usual steam reforming processes, i.e. below about 800° C, the equilibria for coke reduction are not particularly favorable. Neither are the kinetics. In fact, for both reactions (4), (5) and a third reaction, $$CO_2 + C \rightleftharpoons 2CO \qquad (6)$$

the reactions are extremely slow below 800° C. It is believed that this substantially accounts for the failure of earlier steam reforming processes to adequately deal with coke precursors in the feedstock. Above this temperature, the reaction rate begins to increase rapidly, and between 900° C and 1000° C, the rate for reaction (4) increases roughly four times. For some cokes, the rate doubles roughly every 25°–30° C between 840° C and 1125° C. (The rate is known to depend in part upon the type of coke being gasified.) With most endothermic reactions, the rate increases rapidly to 1000°–1100° C and thereafter doubles about every 100° C, with each progressive increment of rate change requiring a large increment of temperature difference. In accordance with the present invention, steam reformation is performed at a high temperature suitable to achieve favorable kinetic effects.

Increase of temperature has an influence upon all reactions in a system. In the system under consideration here, all of the coke precursor reactions are endothermic in the direction written, and so are aggravated by increased temperature. If the rate climbs as rapidly as the rate of coke gasification, net coke deposition will be as likely to obtain at the higher temperature as at the lower. A balance can be obtained only when the rate of laydown is met or exceeded by the rate of removal. In accordance with the present invention, the steam reformer 10 is operated at temperatures sufficient to insure, for the given set of conditions, that the rate of gasification will be sufficiently high to preclude coke accumulation. It has been determined experimentally by me that the rate of gasification is sufficient to maintain equilibrium at temperatures above 980° C for certain light distillates, including certain gasolines, but more preferably above 1100° C. The precise temperature depends in part upon the composition of the feedstock and in part upon certain other factors to be explained presently which I use to help maintain equalibrium between coke laydown and coke removal.

This novel gasification is due in part to the discovery that the rate of thermal decomposition becomes quantitative below the point at which gasification becomes rapid. That is, at about 980° C, substantially total decomposition of the hydrocarbons has occurred, and all of the hydrocarbon reactions have gone nearly to completion. However, increasing the temperature further beyond the temperature conventionally used in steam reformation processes yields an increase in the rate of reactions (4), (5) and (6), particularly reaction (4), and in accordance with this invention, the temperature is increased to that point at which coke gasification is achieved sufficient to balance the coke laydown. This will depend on the type of feedstock, as noted before, but also on the amount of feedstock.

That is, for a given feedstock, apparatus and steaming rate, it has been found that increasing the rate of feedstock flow requires an increase in the temperature of the reactor, exactly according to the above explanation. Coke precipitation being complete, a temperature must be reached at which gasification is sufficient to offset the precipitation. This parallel increase of feedstock mass flow and reaction temperature can proceed until practical limits of reactor hardware, such as heat transfer rates and reactor tube 15 refractoriness, are reached.

It is also possible to affect equilibria selectively, e.g. to favor coke gasification. Reaction (4) does not, of course, occur here simply in a system consisting of only carbon, water, hydrogen and carbon monoxide. Rather, an extremely wide variety of hydrocarbons are also present. The effect of hydrogen on these hydrocarbons is generally favorable to overall gasification, resulting in hydrogenation and the formation of compounds which do not produce coke upon thermal decomposition. So the oxidation of coke by reaction (4) reduces, to some extent, the amount of coke precipitated. Also, steam is at the same time taking part in reactions. Thus, the reaction of steam with methane, e.g., $$CH_4 + H_2O \rightleftharpoons CO + 3H_2 \tag{7}$$

is substantially complete at 900° C, and so the further addition of steam results in further oxidation of the carbon monoxide to produce carbon dioxide, according to the following equation:

$$CH_4 + H_2O \rightleftharpoons CO_2 + H_2 \tag{8}$$

Also, excess steam favors reaction (4) directly due to a LeChatelier shift of the equilibrium (increase of $H_2O$ partial pressure), and indirectly by removal of CO from the system (decrease in CO partial pressure). The effect of excess steam upon reaction (4) within a steam reformation system is roughly bimolecular, causing a shift in equilibrium for reaction (4) of roughly the second order. Consequently, variation of steam content, or more specifically the index steam-to-carbon molar ratio, is an advantageous method of controlling reformer operability. To a lesser degree, it is possible to control the composition of the wet gas output by variation of steam partial pressure. For instance, the reverse of reaction (7) is known to occur by a Fisher-Tropsch mechanism as follows:

$$CO + 3H_2 \rightleftharpoons CH_4 + H_2O \tag{9}$$

This indicates that methane content will decrease with an increase in excess steam, and to a certain extent this phenomenon is controllable.

Reactor tube pressure can also play a significant role in these equilibria considerations. Prior to this invention, it has been difficult to gasify oils at high pressure, due to the unfavorable effect upon coke production. All of the coke production reactions are favored by increased pressure, since they all have a solid product. Consequently, in conventional systems, the process parameters have been selected so that this increase in carbon product has been avoided, since no mechanism was provided to allow coke gasification. Increased gasification pressures have recently been achieved, up to 700 psi in some cases, but only through careful balancing of selected feedstock and catalyst combinations. In my system, increased pressure also increases coke formation, and decreases the amount of gasification according to reactions (4), (5) and (6). However, this effect is overcome by increases in temperature. I have experimentally demonstrated that temperature and pressure are directly related over a portion of the operability range of my system.

The rate of reaction is also affected by the amount of surface area exposed to the reaction system, and by the mixing of that stream with the coke. In general, reactivity will increase with coke surface area. Moreover, it is important to achieve turbulent conditions at the surface of the coke, in order to prevent maintenance of laminar gas films in equilibrium at that surface. If the oxides of carbon produced are constantly swept away, equilibrium dynamics will demand further oxidation of the coke. In this sense, then, successful gasification depends upon equilibrium not being maintained. It is also known that surface catalysis effects are important for most gas phase reactions; the hot surface of the reactor in contact with the coke and gases promotes rapid reaction. This set of considerations — surface area, turbulence and surface catalysis (in the broadest sense — indicate the design of an apparatus to maximize these effects, and experimentation has shown various hardware to predictably affect the operability of the reaction in the manner described.

Steam for the reaction is generated, in part, by indirect heat exchange with reaction streams according to conventional technology. In most cases, however, it is necessary to generate additional steam, or to superheat the steam to a suitable working temperature, by other methods, such as the direct combustion of fuel to fire a boiler. Consequently, steam production, in terms of both heat and water, is one of the major utility requirements of any steam reformation system. Moreover, excess steam in the output gases yields, on condensation, energy at such a low temperature as may be generally unusable. A minimum of steam utilization is desirable, therefore, for purposes of thermal economy. A certain minimum of steam must be maintained, of course, to provide sufficient reactant for a stoichiometric mass balance at the achieved product composition, and additional steam may be used to influence the thermodynamics in the manner described previously. The amount of steam which is desirable will vary most closely with feedstock composition and rate, and a preferred steam-to-carbon molar ratio must be derived experimentally for each feedstock. In general, the ratio increases with the specific gravity of the feedstock, ranging from as low as 1.8 to 1 up to 4 or 5 depending on whether the feedstock treated is a light distillate, a natural gasoline, a middle distillate, crude oil or heavy residual oils which have high C/H ratios. For any given feedstock, however, it is desirable to control the ratio within fairly narrow limits so that the rate of coke laydown in the reactor is just balanced by the rate of coke removal. A ratio significantly higher than this is undesirable because it increases the energy requirements of the system in order to create the added steam.

Although a preferred steam-to-carbon ratio is discoverable for any particular set of feedstock, apparatus and operating conditions, some variation from that ratio is both inevitable and desirable. However, it is crucial to reformer longevity and performance that coke not be allowed to accumulate beyond the point of the inventory specified by the equilibrium considerations for the reactor in question, or the output of the unit may degrade in quality or, in some cases, the unit may go into a runaway fouling condition due to decreased thermal transfer and reactivity of the coke formations. Excessive coking can be avoided, as discussed, by fixing temperature or steaming rate, or some combination of the two, invariably at a point sufficiently in excess of equilibrium to insure that such unbalance never occurs, but that is undesirable due to the increased energy requirements. It is more desirable to keep temperature and steaming rates as close to the point of balance as possible.

If steam-to-carbon ratio is controlled close to the point of balance by, for instance, fixing the mass flow of feedstock and water, imbalances are virtually certain to occur with most of the heavier feedstocks. In particular, the coking rate will vary due to minor variations in hydrocarbon or contaminant composition, transient pressure conditions, transient inadequacies in mixing, etc. However, it has been determined experimentally that the balance point can be approximated quite closely if means are provided to instantaneously adjust the flow of reactants relative to each other and relative to the size of the coke inventory in the reactor. Various means are possible to attain this control, but one technique has been developed which provides superior subtlety of control, while remaining extremely simple in construction.

More particularly, deposition of carbon within reactor tube 15 will cause an increase in pressure drop across the reaction path and this pressure drop provides a means of indexing the amount of carbon present in the tube. As the cross-sectional area of the reactor tube decreases relative to mass flow of reactants (as the pressure drop increases) deposition of carbon has an increasingly sensitive effect upon pressure drop. If a fixed calibrated orifice is provided in the conduit conducting the steam (or the feedstock) to the reactor tube, a fixed supply pressure applied to the reactant stream, and a constant backpressure maintained at the output of the system by properly adjusting the regulator in conduit 17, the pressure drop across the calibrated orifice will depend upon the pressure drop across the reactor itself.

Mass flow ($W_h$) through tube 15 may be expressed as follows:

$$W_h \alpha (d_2)^2 \sqrt{\frac{H\rho}{1 - \left(\frac{d_2}{d_1}\right)^4}} \quad (10)$$

where:
$d_2$ = diameter of the orifice 13 or 14;
$d_1$ = diameter of the inlet pipe 11 or 12;
$H$ = differential pressure across the orifice 13 or 14; and
$\rho$ = density of the fluid.

Since $d_1$, $d_2$ and $\rho$ are fixed, $W_h$ is proportional to $\sqrt{H}$. In other words, the rate of mass flow through the reactor tube is proportional to the differential pressure across the superheated steam and feedstock orifices 14 and 13, respectively. In the case of an instability in the system, H will decrease, causing $W_h$ to decrease. If the steam and feedstock orifices are the same size, and the pressure maintained on these feeds is the same, H and consequently $W_h$ for each reactant, will decrease together. However, since $\rho$ is not the same for the two fluids, the decreases in mass flow will not be strictly proportional and the steam-to-carbon ratio will vary. This effect can be combated by adjusting $d_1$, $d_2$ and H (by means of the supply pressure) so that a more nearly linear relationship obtains with variations in reactor pressure. But it is not possible, by the use of orifices alone, to keep the steam-to-carbon ratio exactly constant. Moreover, if a condition of near linearity were obtained as the mass flows decreased, the effect would be that of unloading the reactor, simply reducing its effort. As seen above, this would enhance coke removal by itself.

A preferred embodiment of my system obtains very rapid response to excessive coke inventories by tailoring the discharge across the respective orifices 13 and 14 in such a manner that the rate of decrease of feedstock flow is deliberately disproportionately large with respect to the rate of decrease of steam flow in the case of an increase in reactor pressure. This can be accomplished to some degree by varying any of the factors affecting rate of discharge described above. But the most effective way is by maintaining a differential between the supply pressures of the steam and the feedstock by properly adjusting regulators R in conduits 11 and 12. Specifically, the feed stock should be supplied at a constant pressure lower than that of the steam. For instance, for an orifice arrangement which would provide equal mass flows at equal supply pressures, it is apparent that doubling the steam flow would require increasing H by a factor of four. The precise value of the parameters are, of course, dictated by empirical considerations.

It is also to be noted that variation of the steam supply pressure provides a convenient means of changing preferred steam-to-carbon ratios, within certain limits, when changing feedstock. This arrangement can be very rapid in response to a change in H if, for instance, $d_2$ is very small, or the ratio $d_2/d_1$ is very small, or H is small, etc.

It is equally possible to keep supply pressures constant, and select orifice sizes to achieve control. The principal benefits of this means of control is that it is extremely direct, sensitive and simple. Control is automatic: if carbon deposition exceeds an amount factored into the arrangement of the orifices, both feedstock and steam flow will decrease and so the stream-to-carbon ratio will increase. This will favor coke removal, and the system will move back to the balance point. If, on the other hand, H increases, the opposite effect will occur, and mass flows will increase, again disproportionately, so the system always tends to work against the limit of its ability. No external mechanisms at all are required, as in orifice measuring and control networks proposed in conjunction with many other fluid systems. Here the orifices themselves are used as the control mechanism, and the system is self-regulating.

Although the effect of this arrangement is to make reactor operation very stable, it is anticipated that relatively great swings in performance could still be accommodated, with typical variations estimated at substantially less than 10% of total mass flow. Another advantage of this control system is the extreme simplicity with which control is provided to multiple reactors arranged in parallel. Each reactor need only contain its own orifices, utilizing a common supply at constant pressure and a common constant back pressure outlet, for the control principle to apply.

By means of this invention, then, steam-reformation can be applied to virtually any feedstock hydrocarbon, by careful control of the reactions within the parameters specified. Specific reactor designs are not within the scope of this invention, although it is believed that variations on existing commercial hardware employed for alternative known processes would be suitable.

EXAMPLE 1

A reactor was constructed similar to that illustrated in FIG. 1, with a reactor tube approximately 8 inches long and having an inside diameter of 0.75 inch. The tube contained approximately 20 twisted strips the length of the tube. The tube was formed of Inconel 600, as were the twist strip packings, and external fins were turned onto the tube. The gasoline inlet pipe measured 0.25 inch ID with a 0.03 inch orifice. The steam inlet pipe was 0.63 inch ID with a 0.08 inch orifice. A commercial gasoline with an endpoint of about 200° C, density of 0.75 and and specific gravity of 0.75 was injected into the reactor at a rate of 25 cc/minute. Superheated steam at 1069° C was injected at a rate of 50 cc/minute. The reactor pressure was 72 psig, and the gas stream was maintained at about 984° C. The pressure differential across the orifices was 5 psi and 10 psia, respectively, and the steam-to-carbon ratio was 3.2. Over a period of three hours, samples of the product gas were taken and the composition determined chromatographically as follows:

| | |
|---|---|
| Hydrogen | 52.4% |
| Carbon Monoxide | 27.2 |
| Methane | 14.1 |
| Carbon Dioxide | 6.3 |

Subsequent examination of the reactor revealed a gradient distribution of carbon within the reactor from several mils at the entry to substantially zero at the exit.

EXAMPLE 2

A reactor similar to that used in Example 1 was utilized. A commercially obtained residual oil was utilized as feedstock, containing 2.05% sulfur and 0.09% ash, by weight. Superheated steam at 1015° C was injected at a rate of 40 cc/minute, and the feedstock was pumped at a rate of 10 cc/minute. The reactor pressure was 54 psig and reaction temperature was approximately 1120° C. A sample of the product gas chromatographically analyzed showed a composition as follows:

| | |
|---|---|
| Hydrogen | 62.5% |
| Carbon Monoxide | 22.7 |
| Carbon Dioxide | 8.4 |
| Methane | 6.3 |
| Ethylene | 0.016 |

Refer now to FIG. 2 which illustrates a plant using a reactor operating in accordance with this invention. Feedstock is stored in a tank 31 and pressurized by a pump 32 and directed into reactor 30 through conduit 11. Reactor 30 is similar to reactor 10. Water is likewise pumped from a source 36 into a standard demineralizer 34, by a pump 35, and thence to a boiler and superheated 33 where steam is raised and heated to a suitable reaction temperature. The steam is then directed through conduit 12 into reactor 30. Product gas from reactor 30 is directed to various auxiliary apparatus which may be used in conjunction with this system. In this instance, the plant generates synthetic natural gas from the reactor effluent. Consequently, the gas is desulfurized at 42 (unless an extremely low sulfur feedstock is processed) and methanated in a conventional converter 43. This high-Btu product is then fed to a dryer 44 and if a further treatment, such as Btu adjustment, is required, this can be provided at 45. Product gas of pipeline quality is delivered at 46. Of course, the treatment of the output gas of reactor 30 can vary, depending on the eventual product desired. Conventional means are provided at 41 for the removal of slag and ash from reactor 30, in case feedstocks with such contaminants are utilized. Fuel for the burner is provided at 52 and combustion air is provided by blower 51.

It will be seen then, that the present method can reform hydrocarbons having high end-points continuously, at high pressures, without troublesome residual coke reformation and without the necessity of a catalyst. The output of the system could be employed as fuel gas, such as in an automobile engine of the sort disclosed in U.S. Pat. No. 3,682,142, assigned to the assignee of the present invention, or for petrochemical production or for any other suitable use. Since certain changes may be made in carrying out the method of the invention and in the apparatus employed without departing from the scope of the invention, it is intended that all matter in the above description and the accompanying drawing shall be interpreted as illustrative and not limiting. The objects set forth above, among those made apparent in the preceding description, being efficiently obtained.

I claim:

1. A method of steam reforming a hydrocarbon feedstock including coke precursors which comprises the steps of
  A. flowing the feedstock through a tube of a noncatalytic reactor,
  B. simultaneously flowing superheated steam through said tube,
  C. heating the reactor tube sufficiently to effect substantially complete conversion of the feedstock into fixed gaseous products and coke,
  D. maintaining reactor tube temperature sufficient to simultaneously effect oxidation of said coke by the superheated steam,
  E. continuously controlling the steam-to-carbon molar ratio of the feedstock and steam reactants in the reactor tube to maintain a balance between the rate of coke laydown on the interior surfaces of the reactor tube and the rate of coke removal therefrom so that a substantially constant coke inventory remains in the reactor tube.

2. The method defined in claim 1 in which the ratio is controlled so that an increase in coke inventory in the reactor tube produces an immediate reduction of feedstock flow into the reactor tube relative to superheated steam flow into the reactor tube.

3. The method defined in claim 2 in which said ratio control is achieved by
  A. maintaining the reactor outlet output at a constant back pressure,
  B. maintaining the feedstock and superheated steam at a fixed supply pressure higher than the reactor outlet pressure,
  C. situating orifices in the feedstock and steam inlets to the reactor, and D. selecting the sizes of the orifices so that the ratio of steam-to-carbon molar flow through said orifices varies in a predetermined manner with the pressure differential between inlet and outlet of the reactor.

4. The method defined in claim 2 in which said ratio control is achieved by
  A. selecting the sizes of the feedstock and steam inlets to the reactor, and
  B. controlling the supply pressure of the feedstock and steam so that the ratio of steam-to-carbom molar flow through said reactor tube varies directly with the pressure differential between inlet and outlet of the reactor.

5. The method defined in claim 4 in which the superheated steam supply pressure is maintained higher than the feedstock supply pressure.

6. The method defined in claim 1 in which the reactor tube temperature is maintained greater than 980° C.

7. The method defined in claim 6 in which the reactor tube temperature is maintained between 1130° C. and 1390° C.

8. The method defined in claim 1 in which the superheated steam is supplied at a temperature in excess of 1000° C.

9. The method defined in claim 1 in which at least part of the superheated steam is substituted for by an oxygen-containing gas.

10. The method defined in claim 1 in which the residence time of the feedstock and steam in the reactor tube is maintained between 0.5 and 1.5 seconds.

11. A process as defined in claim 1 wherein the molar ratio of steam to feedstock is at least 1.8 to 1.

12. A process as defined in claim 1 wherein said hydrocarbon feedstock is an oil.

13. A process as defined in claim 3 wherein the molar ratio of steam to feedstock is at least 1.8 to 1.

14. A process as defined in claim 3 wherein said hydrocarbon feedstock is an oil.

15. A process as defined in claim 8 wherein said hydrocarbon feedstock is an oil.

16. A process as defined in claim 10 wherein said hydrocarbon feedstock is an oil.

* * * * *